United States Patent
Kim (10) Patent No.: US 12,280,651 B2
(45) Date of Patent: Apr. 22, 2025

(54) BATTERY-PACK MOUNTING STRUCTURE FOR VEHICLE

(71) Applicants: Hyundai Motor Company, Seoul (KR); Kia Corporation, Seoul (KR)

(72) Inventor: Jin Won Kim, Pyeongtaek-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 433 days.

(21) Appl. No.: 17/843,074

(22) Filed: Jun. 17, 2022

(65) Prior Publication Data

US 2023/0191885 A1 Jun. 22, 2023

(30) Foreign Application Priority Data

Dec. 17, 2021 (KR) .................. 10-2021-0181675

(51) Int. Cl.
| | | |
|---|---|---|
| *B60K 1/04* | (2019.01) | |
| *B60L 50/60* | (2019.01) | |
| *H01M 50/249* | (2021.01) | |
| *H01M 50/358* | (2021.01) | |

(52) U.S. Cl.
CPC .............. *B60K 1/04* (2013.01); *B60L 50/66* (2019.02); *H01M 50/249* (2021.01); *H01M 50/358* (2021.01); *B60K 2001/0422* (2013.01); *B60Y 2200/91* (2013.01)

(58) Field of Classification Search
CPC ...... B60K 1/04; B60K 2001/0422; B60I 5/66; H01M 50/249; H01M 50/358
See application file for complete search history.

(56) References Cited

U.S. PATENT DOCUMENTS

2010/0307848 A1 * 12/2010 Hashimoto .............. B60K 1/04
180/68.5

FOREIGN PATENT DOCUMENTS

| FR | 2949096 A3 * | 2/2011 | ......... B60H 1/00278 |
|---|---|---|---|
| KR | 10-2020-0107214 | 9/2020 | |
| KR | 10-2022-0154456 | 11/2022 | |

* cited by examiner

*Primary Examiner* — Jason D Shanske
*Assistant Examiner* — James J Triggs
(74) *Attorney, Agent, or Firm* — Morgan, Lewis & Bockius LLP (57) ABSTRACT

A battery-pack mounting structure for a vehicle, includes: a lower casing surrounding a lower side of a battery pack; an upper casing surrounding an upper side of the battery pack, and coupled to the lower casing to form a battery casing coupled to a bottom side of a vehicle body panel; a casing gasket provided in a coupling portion between the lower casing and the upper casing and implementing a sealing between the lower casing and the upper casing; an inlet gasket provided in a portion where an inlet provided in the upper casing is connected to the vehicle body panel and implementing a sealing between the inlet and the vehicle body panel; and an outlet gasket provided in a portion where an outlet provided in the upper casing is connected to the vehicle body panel and implementing a sealing between the outlet and the vehicle body panel.

15 Claims, 6 Drawing Sheets

BATTERY-PACK MOUNTING STRUCTURE FOR VEHICLE

CROSS REFERENCE TO RELATED APPLICATION

The present application claims priority to Korean Patent Application No. 10-2021-0181675, filed Dec. 17, 2021, the entire contents of which is incorporated herein for all purposes by this reference.

BACKGROUND OF THE PRESENT DISCLOSURE

Field of the Present Disclosure

The present disclosure relates to a battery-pack mounting structure for a vehicle.

Description of Related Art

Hybrid vehicles, electric vehicles or the like is loaded with a high-voltage battery (hereinafter, referred to as a "battery pack").

The battery pack is so bulky that the marketability of the vehicle may decrease because an internal space, a trunk space, etc., of the vehicle is cramped when the battery pack is mounted to the interior of the vehicle.

Therefore, the battery pack is mounted to the exterior of the vehicle to prevent the internal space and the trunk compartment of the vehicle from being cramped.

Meanwhile, the battery pack needs to be cooled. When an air-cooling method is used to cool the battery pack, air is introduced into the battery pack and discharged after cooling the battery pack. Therefore, a battery casing, in which the battery pack is accommodated, is required to have an inlet and an inlet duct for drawing in air necessary for cooling the battery pack, and an outlet and an outlet duct for discharging the air after the cooling.

When the battery pack is mounted to the exterior of the vehicle, it does matter most that watertight performance is secured to prevent water from penetrating into the battery pack. Therefore, it is advantageous that the inlet and the outlet are structured to fluidically communicate with the interior of the vehicle.

However, in the instant case, there is a problem in that harmful gas may flow into the interior of the vehicle when the harmful gas is generated in the battery pack due to the thermal runaway or the like phenomenon of the battery pack.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery-pack mounting structure for a vehicle, in which a battery pack is mounted to the exterior of the vehicle to prevent an internal space and a trunk compartment of the vehicle from being cramped and thus increase the marketability of the vehicle, and in which not only sufficient watertight performance of the battery pack is secured but also harmful gas is prevented from flowing into the interior of the vehicle even when the harmful gas is generated in the battery pack due to the thermal runaway or the like phenomenon of the battery pack.

According to an aspect of the present disclosure, a battery-pack mounting structure for a vehicle includes: a lower casing surrounding a lower side of a battery pack; an upper casing surrounding an upper side of the battery pack, and coupled to the lower casing to form a battery casing coupled to a bottom side of a vehicle body panel; a casing gasket provided in a coupling portion between the lower casing and the upper casing and implementing a sealing between the lower casing and the upper casing; an inlet gasket provided in a portion where an inlet provided in the upper casing is connected to the vehicle body panel and implementing a sealing between the inlet and the vehicle body panel; and an outlet gasket provided in a portion where an outlet provided in the upper casing is connected to the vehicle body panel and implementing a sealing between the outlet and the vehicle body panel.

The inlet may be connected to a lower side of a first-row passenger seat of the vehicle; and the outlet may be connected to a lower side of a second-row passenger seat of the vehicle.

Inside the battery casing formed by the upper casing and the lower casing, a channel portion may be independently provided to form an air channel by connecting the battery pack to the inlet and the outlet.

The channel portion may include: an upper duct connected to the inlet while covering an upper side of the battery pack; a lower duct fluidically communicating with a blower while covering a lower side of the battery pack; and an outlet duct connected from the blower to the outlet.

The battery casing may include a ventilation valve automatically opened or closed to relieve the difference in pressure between an outside and an inside of the battery casing under a normal condition and discharge a gas when gassing occurs due to thermal runaway.

The battery-pack mounting structure may further include: a first valve provided to open or close the inlet; a second valve provided to close the outlet and make an internal space of the channel portion fluidically communicate with an internal space of the battery casing; and a controller electrically connected to the first valve and the second valve and provided to control the first valve to close the inlet and the second value to close the outlet and make the internal space of the channel portion fluidically communicate with the internal space of the battery casing when the gassing of the battery pack is detected.

The first valve may be provided in the upper duct of the channel portion.

The first valve may be provided in a vehicle body duct provided in a vehicle body to guide air to the upper duct of the channel portion.

The second valve may be provided in the lower duct of the channel portion.

The second valve may be provided to rotate in the lower duct and switch over between a state that an internal space of the lower duct is isolated from the internal space of the battery casing, and a state that the internal space of the lower duct is blocked from the blower but fluidically communicates with the internal space of the body casing.

According to an aspect of the present disclosure, a battery-pack mounting structure for a vehicle includes: a battery casing accommodating a battery pack therein, formed with, at a top side thereof, an inlet for drawing in air to cool the battery pack and an outlet for discharging the air after cooling the battery pack, and coupled to a bottom side of a vehicle body panel; an inlet gasket provided to seal a space between the inlet and the vehicle body panel; an outlet gasket provided to seal a space between the outlet and the vehicle body panel; an upper duct forming an air channel from the inlet to the battery pack inside the battery casing; a lower duct forming an air channel from the battery pack to a blower inside the battery casing; and an outlet duct forming an air channel from the blower to the outlet inside the battery casing.

The upper duct may include a first valve for closing the air channel connected from the inlet to the battery pack; and the lower duct may include a second valve for switching over between a state where an internal space of the lower duct fluidically communicates with an internal space of the battery casing while closing the air channel connected from the battery pack to the blower, and a state where the internal space of the lower duct is isolated from the internal space of the battery casing while opening the air channel connected from the battery pack to the blower.

The battery-pack mounting structure may further include a controller electrically connected to the first valve and the second valve and configured for selectively controlling the first valve to close the air channel connected from the inlet to the battery pack, and selectively controlling the second valve to close the air channel connected from the battery pack to the blower and allow the internal space of the lower duct to fluidically communicate with the internal space of the battery casing, when gassing of the battery pack is detected.

The battery casing may include a ventilation valve automatically opened or closed to relieve the difference in pressure between an outside and an inside of the battery casing under a normal condition, but discharge a gas when gassing occurs due to the thermal runaway.

The battery casing may include an upper casing provided with the inlet and the outlet, and a lower casing coupled to a lower side of the upper casing, and may include a casing gasket for implementing a sealing function in a coupling portion between the upper casing and the lower casing.

The inlet may be connected to a lower side of a first-row passenger seat of the vehicle, and the outlet may be connected to a lower side of a second-row seat via an extension duct.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Regarding embodiments of the present disclosure included in the present specification or application, the specific structural or functional description is merely illustrative for describing the exemplary embodiments of the present disclosure, and embodiments of the present disclosure may be implemented in various forms but not be construed as being limited to the exemplary embodiments set forth in the present specification or application.

Because the exemplary embodiments of the present disclosure may be variously modified and have various forms, specific exemplary embodiments will be illustrated in the drawings and described in detail in the present specification or application. However, it may be understood that embodiments of the present disclosure are intended not to be limited to the specific embodiments but to cover all modifications, equivalents or alternatives without departing from the spirit and technical scope of the present disclosure.

Terms such as "first" and/or "second" are used herein merely to describe a variety of elements, but the elements are not limited by these terms. Such terms are used only for distinguishing one element from another element. For example, without departing from the conceptual scope of the present disclosure, a first element may be referred to as a second, and vice versa.

When a certain element is referred to as being "connected to" or "coupled to" another element, it will be understood that they may be directly connected to or coupled to each other but or intervening elements may be present therebetween. On the other hand, when a certain element is referred to as being "directly connected to" or "directly coupled to" another element, it will be understood that no intervening elements are present therebetween. Other expressions describing relationships between elements, such as "between," "immediately between," "adjacent to," "directly adjacent to," or etc. may also be construed in the same manner.

Terms used in the exemplary embodiment are merely used for explaining specific embodiments, but not intended to limit the present disclosure. Unless the context clearly dictates otherwise, singular forms include plural forms as well. It is to be understood that terms "include," "have," etc. as used herein specify the presence of stated features, integers, steps, operations, elements, components, or combination thereof, but do not preclude the presence or addition of one or more other features, integers, steps, operations, elements, components or combination thereof.

Unless defined otherwise, all terms used herein including technical or scientific terms have the same meanings as those generally understood by a person having ordinary knowledge in the art to which the present disclosure pertains. The terms such as those defined in generally used dictionaries are construed to have meanings matching that in the context of related technology, and unless clearly defined otherwise, are not construed to be ideally or excessively formal.

Below, the present disclosure will be described in detail by describing embodiments with reference to the accompanying drawings. Like reference numerals in the drawings refer to like numerals.

Referring to FIG. 1, FIG. 2, FIG. 3, FIG. 4, FIG. 5, FIG. 6, FIG. 7, FIG. 8 and FIG. 9, a battery-pack mounting structure for a vehicle according to an exemplary embodiment of the present disclosure includes a lower casing 3 surrounding a lower side of a battery pack 1; an upper casing 9 surrounding an upper side of the battery pack 1, coupled to the lower casing 3 to form a battery casing 5, and fastened to a bottom side of a vehicle body panel 7; a casing gasket 11 interposed in a coupling portion between the lower casing 3 and the upper casing 9 and implementing a sealing function; an inlet gasket 15 provided in a portion where an inlet 13 provided in the upper casing 9 is connected to the vehicle body panel 7 and implementing a sealing function; and an outlet gasket 19 provided in a portion where an outlet 17 provided in the upper casing 9 is connected to the vehicle body panel 7 and implanting a sealing function.

In other words, the structure according to the present disclosure stably secures watertight conditions for preventing the penetration of water even though the battery pack 1 inside the battery casing 5 is mounted to the exterior of the vehicle, as the battery casing 5 is mounted to a bottom side of the vehicle body panel 7, a space between the lower casing 3 and the upper casing 9 is sealed with the casing gasket 11, and the inlet 13 and the outlet 17 of the upper casing 9 are coupled to the vehicle body panel 7 through the inlet gasket 15 and the outlet gasket 19, respectively, in the state that the battery pack 1 is accommodated in the battery casing 5 including the lower casing 3 and the upper casing 9.

The inlet 13 is connected to a lower side of a first-row passenger seat 21 of the vehicle, and the outlet 17 is connected to a lower side of a second-row seat 23 of the vehicle via an extension duct 16.

Figure 1:
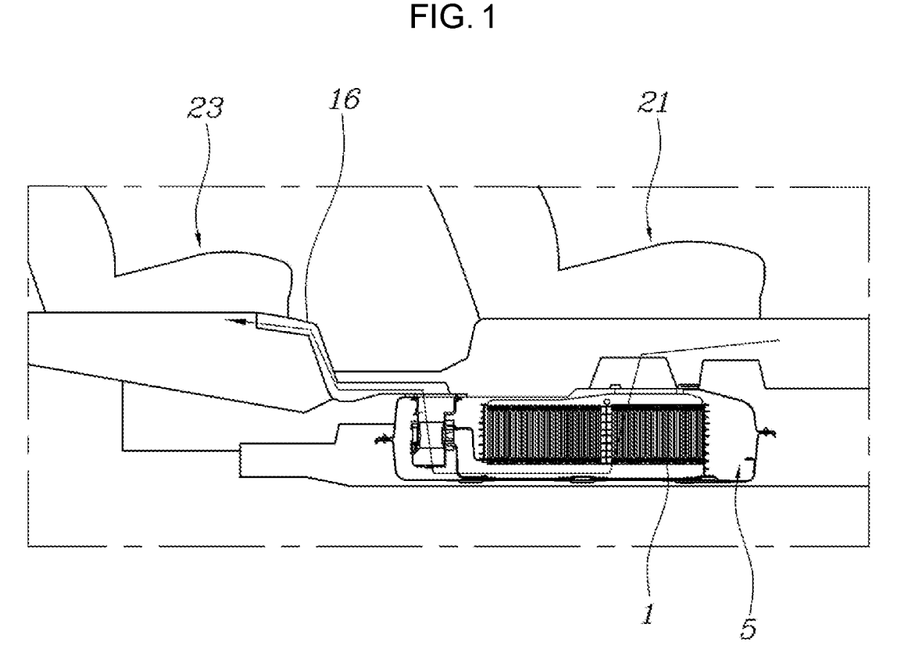
FIG. 1 illustrates a battery-pack mounting structure for a vehicle according to the present disclosure.

Therefore, air for cooling the battery pack 1 flows along a path denoted by the arrow shown in FIG. 1. Air from the interior of the vehicle circulates, cools the battery pack 1 inside the battery casing 5, and then returns to the interior of the vehicle. Therefore, air-cooling performance is smoothly and stably secured in the state that water from the outside of the vehicle is prevented from penetrating into the battery pack 1.

Figure 2:
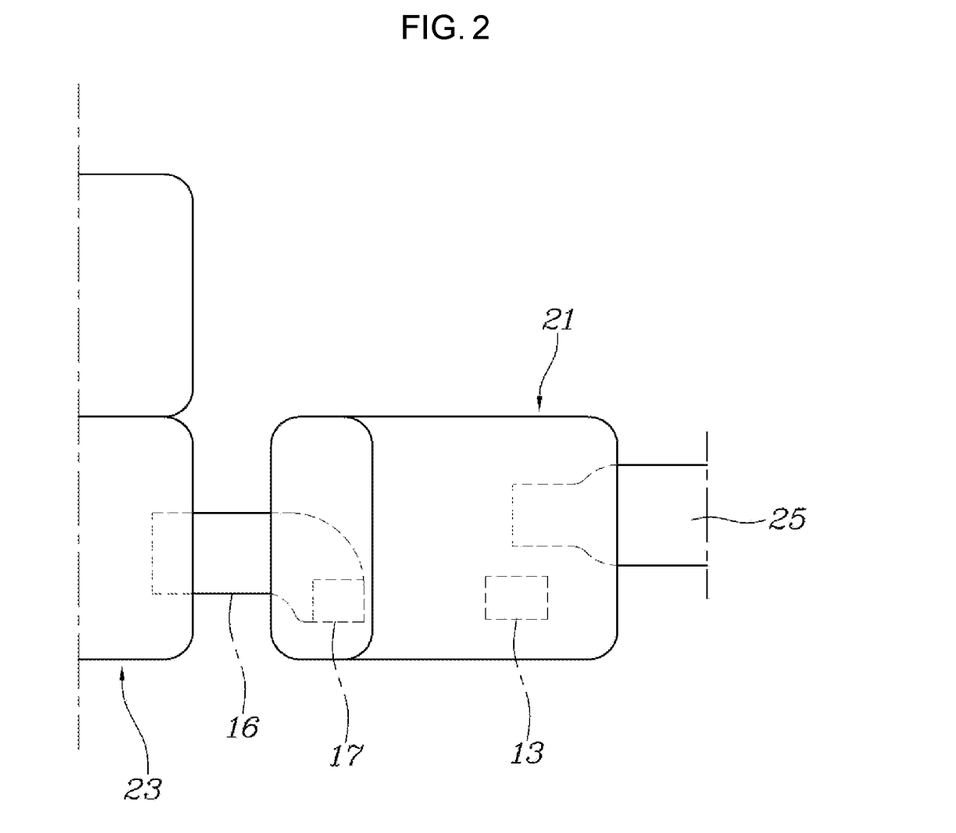
FIG. 2 illustrates the battery-pack mounting structure of FIG. 1, viewed from top.
Figure 3:
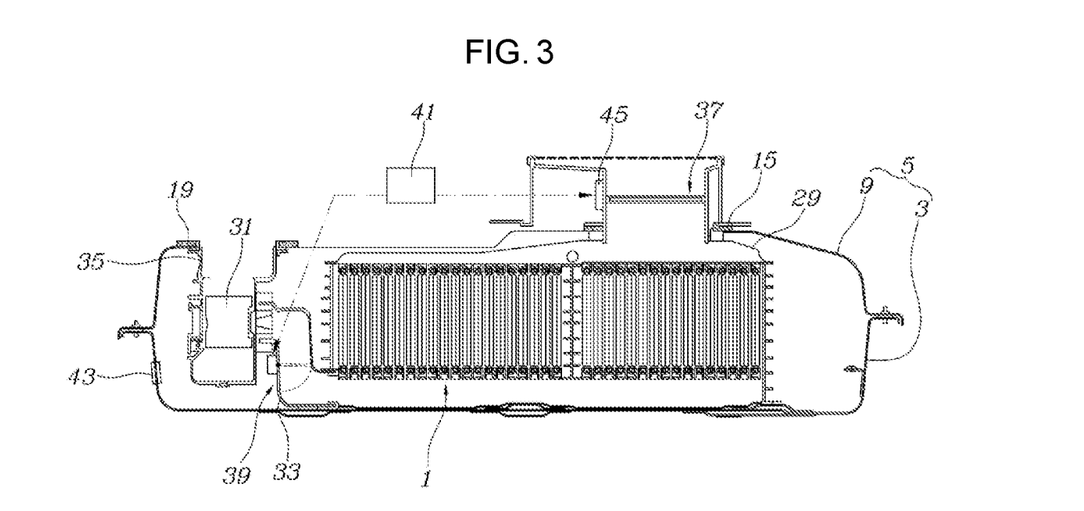
FIG. 3 illustrates details around a battery casing of FIG. 1.
Figure 4A:
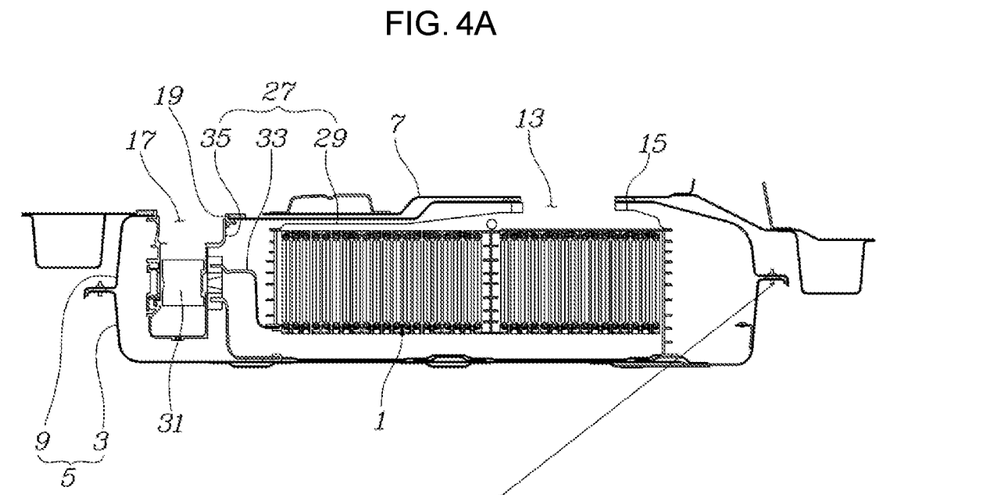
FIG. 4A and FIG. 4B illustrate a casing gasket, an inlet gasket, and an outlet gasket.
Figure 4B:
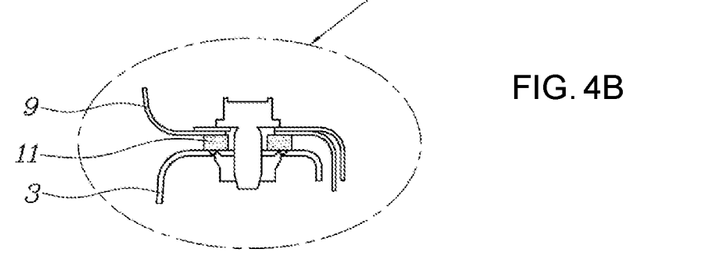
Figure 5:
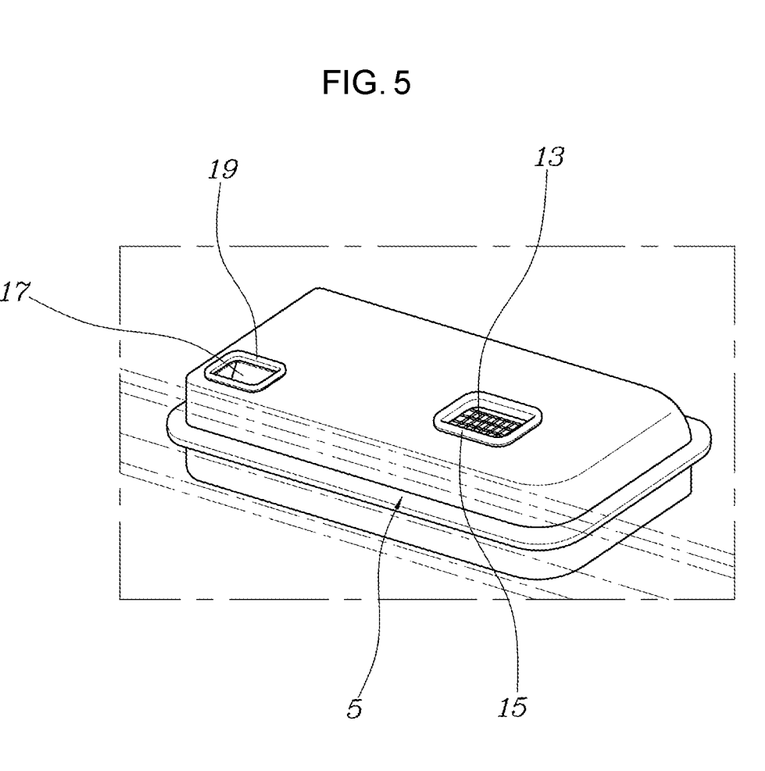
FIG. 5 illustrates the battery casing, viewed from above.

Meanwhile, referring to FIG. 2, under the first-row passenger seat 21, an air conditioning duct 25 is provided adjacent to the inlet 13 and extends from an air conditioner placed in a front side of the vehicle, sufficiently securing cooling and heating performance for second-row passengers Inside the battery casing 5 formed by the upper casing 9 and the lower casing 3, a channel portion 27 is independently provided to form an air channel by connecting the battery pack 1 to the inlet 13 and the outlet 17.

In other words, the channel portion 27 refers to a separate space that forms the air channel passing through the battery pack 1 inside the battery casing 5.

In the present exemplary embodiment of the present disclosure, the channel portion 27 includes an upper duct 29 covering an upper side of the battery pack 1 and connected to the inlet 13; a lower duct 33 covering a lower side of the battery pack 1 and fluidically communicating with a blower 31; and an outlet duct 35 connected from the blower 31 to the outlet 17.

Therefore, when the blower 31 operates, air from the interior of the vehicle flows into the upper duct 29, passes through the battery pack 1 while cooling the battery pack 1, passes through the lower duct 33 and the outlet duct 35 in sequence, and then returns to the interior of the vehicle through the outlet 17.

Figure 6:
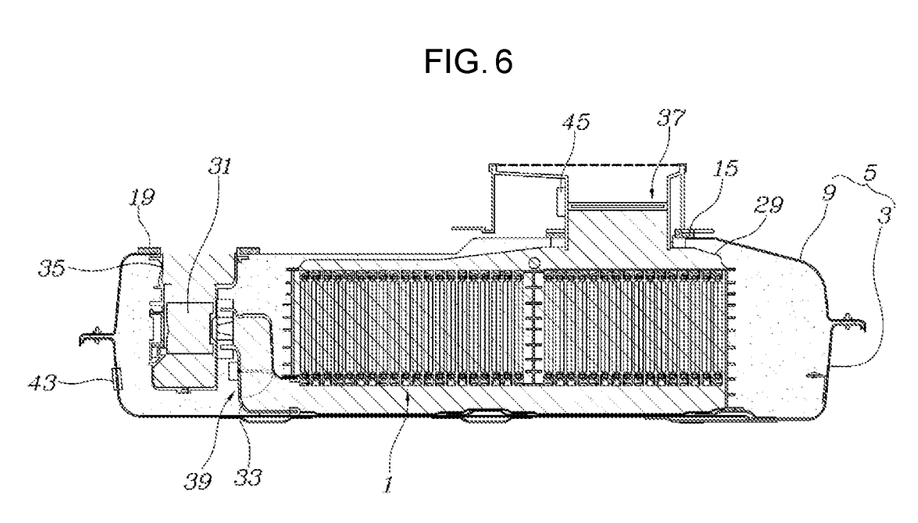
FIG. 6 illustrates an internal space and a channel portion distinctively in the battery casing of FIG. 3.

For reference, in FIG. 6, the hatching pattern for the channel portion 27 is different from that for the internal space of the battery casing 5 except the channel portion 27.

According to the present disclosure, the battery-pack mounting structure for the vehicle further includes a first valve 37 provided to open or close the inlet 13; a second valve 39 provided to close the outlet 17 and at the same time make the internal space of the channel portion 27 fluidically communicate with the internal space of the battery casing 5; and a controller 41 controlling the first valve 37 to close the inlet 13 and the second valve 39 to close the outlet 17 so that the internal space of the channel portion 27 can fluidically communicate with the internal space of the battery casing 5 when gassing of the battery pack 1 is detected.

Therefore, the inlet 13 and the outlet 17 are maintained opened by the first valve 37 and the second valve 39 under a normal condition that gassing does not occur in the battery pack 1. However, when gassing occurs due to thermal runaway or the like in the battery pack 1, the controller 41 detects the occurrence of the gassing, and controls the first valve 37 and the second valve 39 to close the inlet 13 and the outlet 17, preventing gas generated in the battery pack 1 from flowing into the interior of the vehicle.

When the second valve 39 closes the outlet 17, the internal space of the channel portion 27 fluidically communicates with the internal space of the battery casing 5, and therefore gas generated in the battery pack 1 flows in the battery casing 5.

Figure 9:
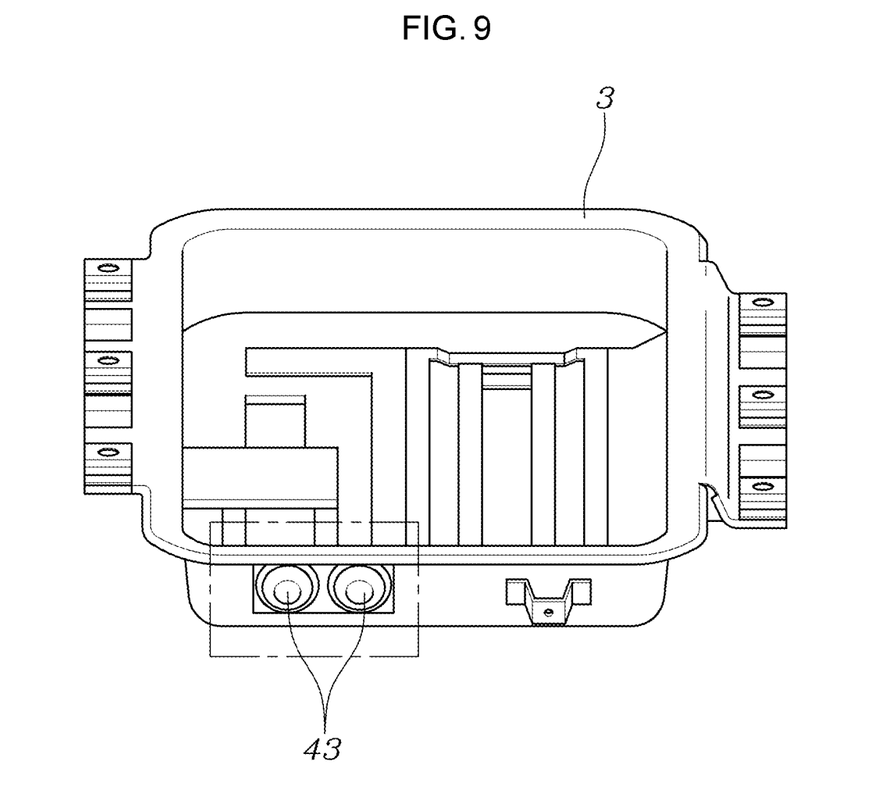
FIG. 9 illustrates that a ventilation valve is formed in a lower casing.

Furthermore, a ventilation valve 43 is provided in the battery casing 5 and automatically opened or closed to relieve difference in pressure between the inside and outside of the battery casing 5 under the normal condition, but discharge a lot of gas under the condition that gassing occurs due to the thermal runaway. Therefore, the gas flowing in the battery casing 5 is discharged to the outside of the battery casing 5, i.e., the atmosphere through the ventilation valve 43.

For reference, the normal condition refers to not a condition that the battery pack 1 generates a large amount of gas due to thermal runaway or the like but a condition that the battery pack 1 is in a normal operation.

The ventilation valve 43 is opened to allow air to pass through the battery casing 5 to such an extent that the pressure difference between the inside and outside of the battery casing 5 may be relieved under the normal condition, but to discharge a lot of gas under the condition that gassing occurs due to the thermal runaway or the like of the battery. Here, a publicly known valve may be used as the ventilation valve 43.

Figure 7:
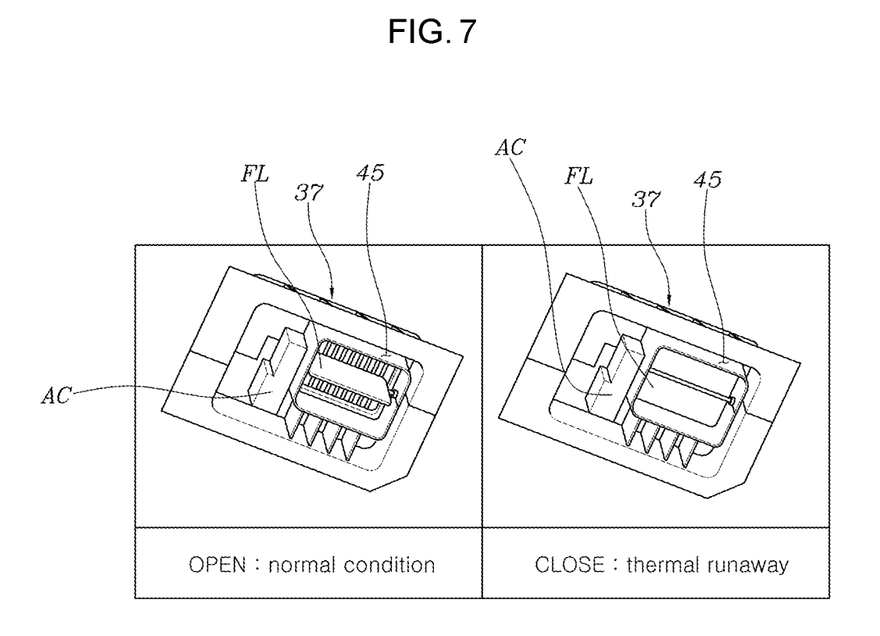
FIG. 7 illustrates an example that a first valve is provided in a vehicle body duct.

The first valve 37 may be provided in a vehicle body duct 45 provided in a vehicle body to guide air to the upper duct 29 of the channel portion 27.

FIG. 7 illustrates an example that the first valve 37 is provided in the vehicle body duct 45 as described above, in which an actuator AC rotates a valve flap FL to switch over between the state of opening the inlet 13 (see the left side) and the state of closing the inlet 13 (see the right side) under control of the controller 41.

Figure 8:
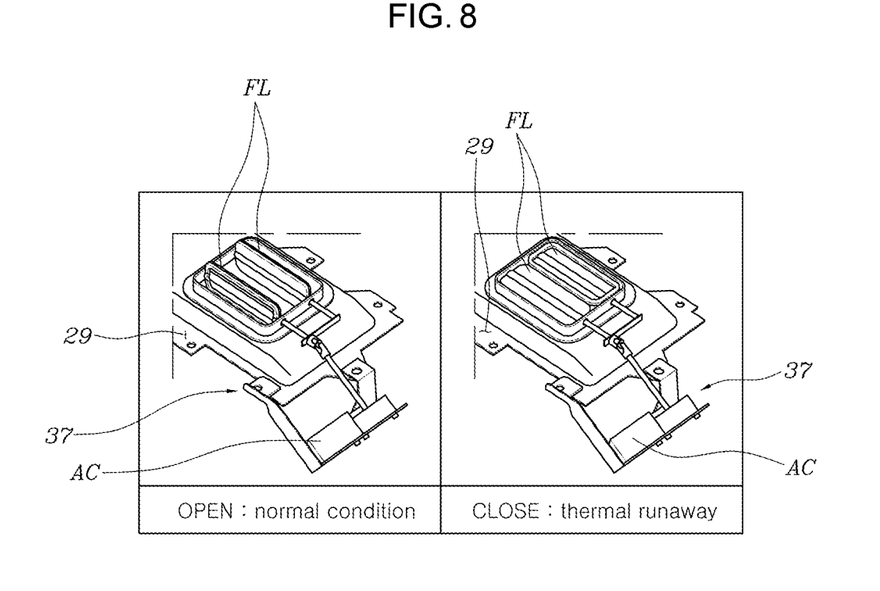
FIG. 8 illustrates an example that the first valve is provided in an upper duct.

Alternatively, the first valve 37 may be provided in the upper duct 29 of the channel portion 27.

FIG. 8 illustrates an example that the first valve 37 is provided in the upper duct 29, in which the actuator AC rotates the valve flap FL to open or close the inlet 13 under control of the controller 41.

The second valve 39 may be provided in the lower duct 33 of the channel portion 27.

In other words, the second valve 39 rotates with respect to the lower duct 33, switching over between the state in which the internal space of the lower duct 33 is isolated from the internal space of the battery casing 5 and the state in which the internal space of the lower duct 33 is blocked from the blower 31 while communicating with the internal space of the battery casing 5.

Of course, the second valve 39 is also structured to switch over between the foregoing states as the actuator AC rotates the valve flap FL under control of the controller 41.

The foregoing battery-pack mounting structure for the vehicle according to the present disclosure may also be expressed as follows.

In other words, the battery-pack mounting structure for the vehicle according to the present disclosure may include: the battery casing 5 accommodating the battery pack 1 therein, the outlet 17 provided on the top sides, of which the inlet 13 for drawing air to cool the battery pack 1 and the outlet 17 for discharging the cooled air, respectively, and coupled to the bottom side of the vehicle body panel 7; the inlet gasket 15 provided to seal a space between the inlet 13 and the vehicle body panel 7; the outlet gasket 19 provided to seal a space between the outlet 17 and the vehicle body panel 7; the upper duct 29 forming the air channel from the inlet 13 to the battery pack 1 inside the battery casing 5; the lower duct 33 forming the air channel from the battery pack 1 to the blower 31 inside the battery casing 5; and the outlet duct 35 forming the air channel from the blower 31 to the outlet 17 inside the battery casing 5.

The upper duct 29 may include the first valve 37 for closing the air channel connected from the inlet 13 to the battery pack 1.

The lower duct 33 may include the second valve 39 for switching over between the state where the internal space of the lower duct 33 fluidically communicates with the internal space of the battery casing 5 while closing the air channel connected from the battery pack 1 to the blower 31, and the state where the internal space of the lower duct 33 is isolated from the internal space of the battery casing 5 while opening the air channel connected from the battery pack 1 to the blower 31.

Furthermore, the controller 41 may be provided to control the first valve 37 to close the air channel connected from the inlet 13 to the battery pack 1, and control the second valve 39 to close the air channel connected from the battery pack 1 to the blower 31 and allow the internal space of the lower duct 33 to fluidically communicate with the internal space of the battery casing 5, when the gassing of the battery pack 1 is detected.

The battery casing 5 may further include the ventilation valve 43 automatically opened or closed to relieve the pressure difference between the outside and the inside under the normal condition, but to discharge a lot of gas under the condition that the gassing occurs due to the thermal runaway.

The battery casing 5 may be divided into the upper casing 9 provided with the inlet 13 and the outlet 17, and the lower casing 3 coupled to the lower side of the upper casing 9; and may include the casing gasket 11 for implanting the sealing function in the coupling portion between the upper casing 9 and the lower casing 3.

The inlet 13 may be connected to the lower side of the first-row passenger seat 21 of the vehicle; and the outlet 17 may be connected to the lower side of the second-row seat 23 via the extension duct 16.

According to the present disclosure, the battery pack is mounted to the exterior of the vehicle to prevent an internal space and a trunk compartment of the vehicle from being cramped and thus increase the marketability of the vehicle. Furthermore, not only adequate watertight performance of the battery pack is secured, but also harmful gas is prevented from flowing into the interior of the vehicle even when the harmful gas is generated in the battery pack due to the thermal runaway or the like phenomenon.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery-pack mounting structure for a vehicle, the structure comprising:
   a lower casing surrounding a lower side of a battery pack;
   an upper casing surrounding an upper side of the battery pack, and coupled to the lower casing to form a battery casing coupled to a bottom side of a vehicle body panel;
   a casing gasket provided in a coupling portion between the lower casing and the upper casing and implementing a sealing between the lower casing and the upper casing;
   an inlet gasket provided in a portion where an inlet provided in the upper casing is connected to the vehicle body panel and implementing a sealing between the inlet and the vehicle body panel; and
   an outlet gasket provided in a portion where an outlet provided in the upper casing is connected to the vehicle body panel and implementing a sealing between the outlet and the vehicle body panel,
   wherein, inside the battery casing formed by the upper casing and the lower casing, a channel portion is independently provided to form an air channel by connecting the battery pack to the inlet and the outlet, and
   wherein the channel portion includes:
   an upper duct connected to the inlet while covering an upper side of the battery pack;
   a lower duct fluidically communicating with a blower while covering a lower side of the battery pack; and
   an outlet duct connected from the blower to the outlet.

2. The battery-pack mounting structure of claim 1,
   wherein the inlet is connected to a lower side of a first-row passenger seat of the vehicle, and
   wherein the outlet is connected to a lower side of a second-row passenger seat of the vehicle.

3. The battery-pack mounting structure of claim 1, wherein the battery casing includes a ventilation valve automatically opened or closed to relieve difference in pressure between an outside and an inside of the battery casing under a normal condition and to discharge a gas when gassing occurs due to thermal runaway.

4. The battery-pack mounting structure of claim 3, further including:
   a first valve provided to open or close the inlet; and
   a second valve provided to selectively close the outlet to make an internal space of the channel portion fluidically communicate with an internal space of the battery casing.

5. The battery-pack mounting structure of claim 4, wherein the first valve is provided in the upper duct of the channel portion.

6. The battery-pack mounting structure of claim 4, wherein the first valve is provided in a vehicle body duct provided in a vehicle body to guide air to the upper duct of the channel portion.

7. The battery-pack mounting structure of claim 4, wherein the second valve is provided in the lower duct of the channel portion.

8. The battery-pack mounting structure of claim 4, further including a controller electrically connected to the first valve and the second valve and provided to control the first valve to close the inlet and the second value to close the outlet and make the internal space of the channel portion fluidically communicate with the internal space of the battery casing when the gassing of the battery pack is detected.

9. The battery-pack mounting structure of claim 8, wherein the second valve is provided to rotate in the lower duct and switch over between a state that an internal space of the lower duct is isolated from the internal space of the battery casing, and a state that the internal space of the lower duct is blocked from the blower but fluidically communicates with the internal space of the body casing.

10. A battery-pack mounting structure for a vehicle, the structure comprising:
    a battery casing accommodating a battery pack therein, formed with, at a top side thereof, an inlet for drawing in air to cool the battery pack and an outlet for discharging the air after cooling the battery pack, and coupled to a bottom side of a vehicle body panel;
    an inlet gasket provided to seal a space between the inlet and the vehicle body panel;
    an outlet gasket provided to seal a space between the outlet and the vehicle body panel;
    an upper duct forming an air channel from the inlet to the battery pack inside the battery casing;
    a lower duct forming an air channel from the battery pack to a blower inside the battery casing; and
    an outlet duct forming an air channel from the blower to the outlet inside the battery casing.

11. The battery-pack mounting structure of claim 10, wherein the upper duct includes a first valve for selectively closing the air channel connected from the inlet to the battery pack, and wherein the lower duct includes a second valve for switching over between a state where an internal space of the lower duct fluidically communicates with an internal space of the battery casing while closing the air channel connected from the battery pack to the blower, and a state where the internal space of the lower duct is isolated from the internal space of the battery casing while opening the air channel connected from the battery pack to the blower.

12. The battery-pack mounting structure of claim 11, further including:
a controller electrically connected to the first valve and the second valve and configured for selectively controlling the first valve to close the air channel connected from the inlet to the battery pack, and selectively controlling the second valve to close the air channel connected from the battery pack to the blower and allow the internal space of the lower duct to fluidically communicate with the internal space of the battery casing, when gassing of the battery pack is detected.

13. The battery-pack mounting structure of claim 12, wherein the battery casing includes a ventilation valve automatically opened or closed to relieve differences in pressure between an outside and an inside of the battery casing under a normal condition, but discharge a gas when the gassing occurs due to the thermal runaway.

14. The battery-pack mounting structure of claim 10, wherein the battery casing includes:
an upper casing provided with the inlet and the outlet;
a lower casing coupled to a lower side of the upper casing; and
a casing gasket for implementing a sealing function in a coupling portion between the upper casing and the lower casing.

15. The battery-pack mounting structure of claim 10,
wherein the inlet is connected to a lower side of a first-row passenger seat of the vehicle, and
wherein the outlet is connected to a lower side of a second-row seat via an extension duct.

* * * * *